H. J. DOUGHTY.
PROCESS OF FORMING TIRES AND MECHANISM FOR PRACTISING THE SAME.
APPLICATION FILED DEC. 17, 1915.

1,337,207.

Patented Apr. 20, 1920.
2 SHEETS—SHEET 1.

Inventor:
Henry J. Doughty
by Emery, Booth, Janney & Varney
Att'ys.

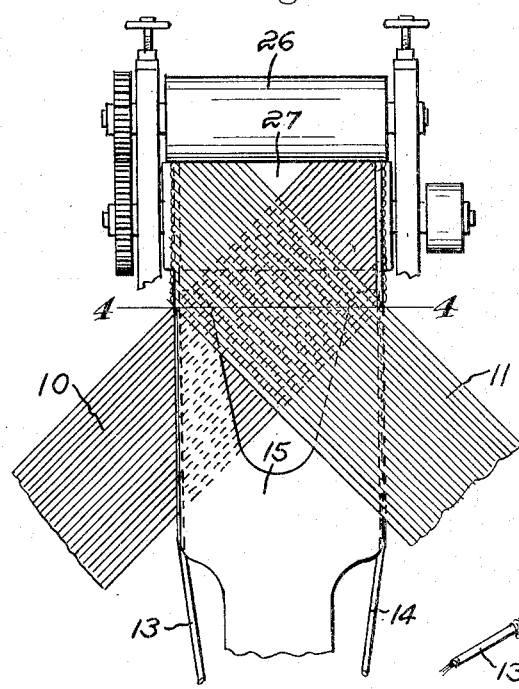

UNITED STATES PATENT OFFICE.

HENRY J. DOUGHTY, OF PROVIDENCE, RHODE ISLAND, ASSIGNOR TO DOUGHTY TIRE COMPANY, OF PORTLAND, MAINE, A CORPORATION OF MAINE.

PROCESS OF FORMING TIRES AND MECHANISM FOR PRACTISING THE SAME.

1,337,207. Specification of Letters Patent. Patented Apr. 20, 1920.

Application filed December 17, 1915. Serial No. 67,465.

*To all whom it may concern:*

Be it known that I, HENRY J. DOUGHTY, a citizen of the United States, and a resident of Providence, in the county of Providence and State of Rhode Island, have invented an Improvement in Processes of Forming Tires and Mechanism for Practising the Same, of which the following description, in connection with the accompanying drawings, is a specification, like characters on the drawings representing like parts.

This invention relates to a process for forming tires such as automobile tires and to a mechanism for practising the same.

My process can be readily understood from the description of an embodiment of a suitable apparatus for practising the same such as the one I have disclosed in the accompanying drawings, wherein:

Fig. 3 is a side elevation of a portion of the layer-forming mechanism;

Fig. 4 is a transverse section upon the line 4—4 of Fig. 3;

Fig. 5 is a perspective view of a series of strands in unwoven condition which enter into the structure of the layers of the tire;

Fig. 6 is a perspective view representing the manner of positioning the strands shown in Fig. 5; and Fig. 7 is a perspective view of a portion of the tire representing certain of the elements thereof in a separated condition.

Figure 1:
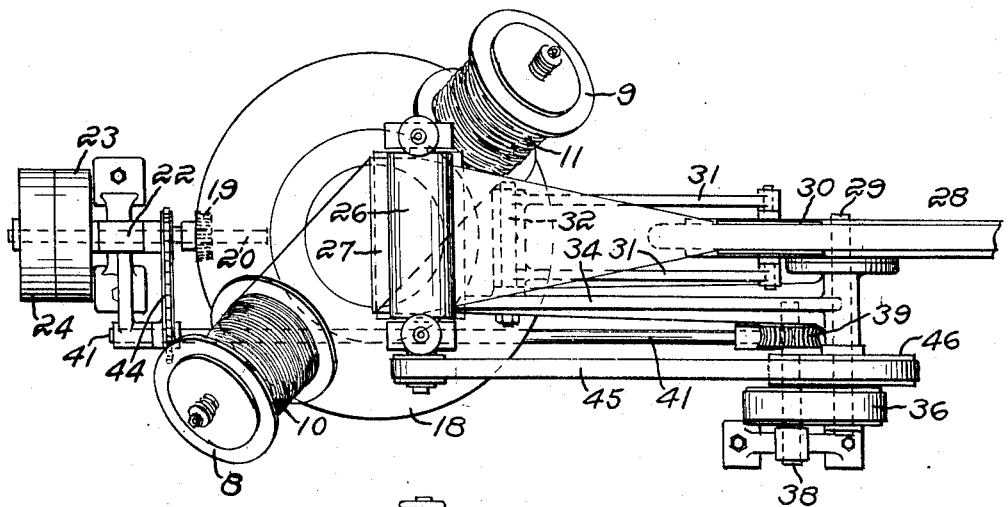
Figure 1 is a plan view of one form of my invention for practising my invention.

The mechanism herein disclosed is intended to form a tire layer of parallel edge strands and one or more series of body strands extending in unwoven condition in a zigzag manner to and about said edge strands. It is evident that in accomplishing the particular purpose of my invention, I may provide mechanism of widely varying character.

In the disclosed embodiment of my invention, the base of the mechanism is represented at 1. Secured in any suitable manner thereto is an upright column or tubular member 2 here represented as slightly tapering and having secured to its upper end a cap-like piece 3 having an outwardly extending flange 4. The upper edge of the member 2 is provided with a groove 5 preferably V-shaped in cross section and adapted to receive the correspondingly shaped edge or flange 6 upon a truncated cone-like member 7 mounted for rotation in said groove 5. The member 7 constitutes a support for one or more spools, herein shown as two in number, at 8, 9. The said spools support a corresponding number of series of strands 10, 11 to constitute the body of the layer.

Figure 2:
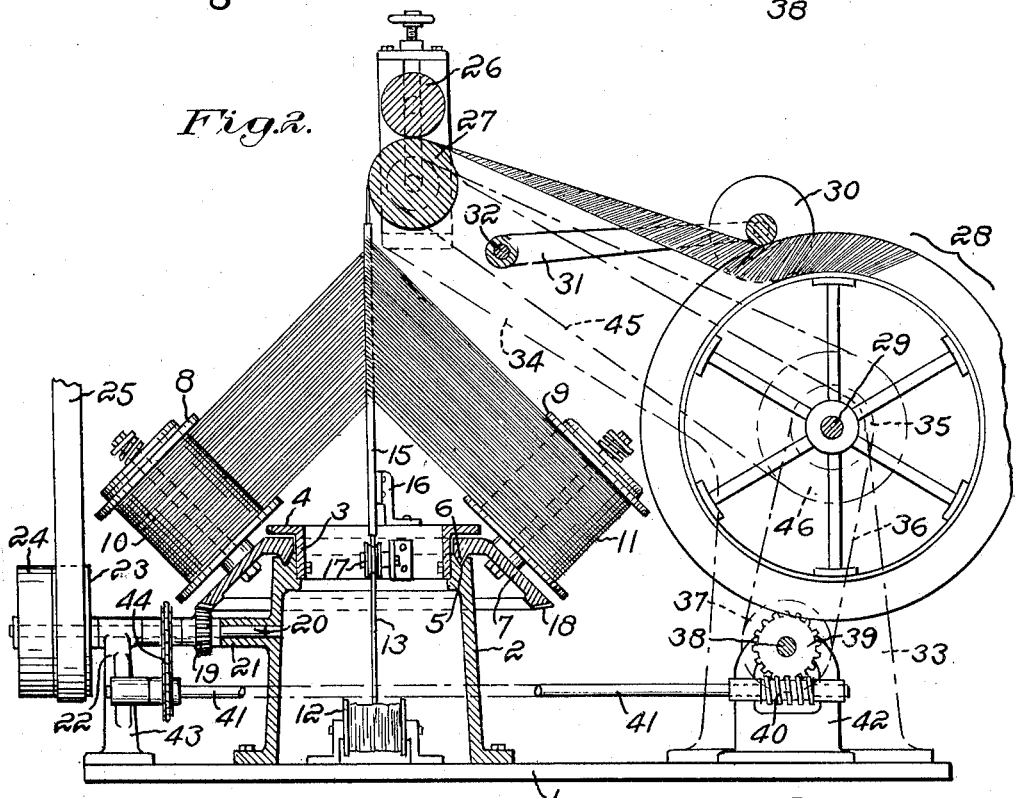
Fig. 2 is a view thereof partially in side elevation and partially in central vertical section.

Preferably mounted upon the base 1 is a pair of spools, one of which is shown at 12. Upon said spools are wound the two edge strands 13, 14, shown also in Figs. 3 and 6. The said edge strands 13, 14 are held in spaced relation at a distance apart corresponding to the width of the layer in extended condition. For that purpose I may provide any suitable supporting means, but in Figs. 2 and 3, I have shown an upright plate 15, which preferably is provided with edge grooves for the reception of said edge strands 13, 14. The plate 15 may be supported in any suitable manner, as by means of a bracket 16. If desired, I may provide guiding pulleys 17, in contact with which edge strands 13, 14 pass. One of these guide pulleys is shown in Fig. 2.

In accordance with my invention I cause a relative revolution of the spools 8, 9 about the edge strands 13, 14. For this purpose any suitable means may be provided. I have herein represented the lower edge of the member 7 as having beveled teeth 18, with which mesh the teeth of a beveled pinion 19 upon a shaft 20 having a bearing in a lateral extension 21 of the support 2 and also in a suitable bracket or upright 22 upon the base 1. Upon said shaft 20 are fast and loose pulleys 23, 24, the former being driven by belt 25 from any suitable source of power. In this or any suitable manner, the spools 9, 10 are revolved about the edge strands 13, 14, and inasmuch as said spools are supported at an incline with respect to said edge strands, the two series of strands 10, 11 are revolved in a zigzag manner about the said edge strands which are continually drawn forward in any suitable manner. The spools 8 revolve in an orbit about the strands 13 and 14 and at the same time rotate about their axes as the strands 10 and 11 are drawn therefrom. In other words the relative motion between the spools and the strands 13 and 14 is planetary or epicyclic.

The strands 13, 14 and the positioned sets of strands 10, 11 are passed through the pressure rolls 26, 27, by which they are smoothed and positioned, the said strands having been calendered, and if desired, impregnated or coated with rubber prior to their winding upon the spools 8, 9.

The assembled strands pass between the rolls 26, 27 toward a suitable former indicated generally at 28 and mounted for rotation upon a suitable axis or shaft 29. The said former is of preferably arched or curved form in cross section, so as to give the proper shape to the layer. If desired, I may provide a suitable presser roll 30 mounted upon arms 31 pivoted at 32 in any suitable manner. The presser roll 30 may be concaved in longitudinal section so as to conform to the shape of the former 28 and the forming layer.

The former 28 may be driven in any suitable manner and may serve as the means for drawing the strands 13 from end to end from the spools 12. I have herein represented it as mounted in uprights 33 in extensions 34 on which the pressure or other rolls 26, 27 are suitably mounted. The shaft 29 of the former 28 is provided with a pulley 35 fast thereon and about which passes a belt or other suitable driving member 36 also passing about a pulley 37 mounted upon a shaft 38. Fast upon the shaft 38 is a worm wheel 39 driven by a worm 40 upon a shaft 41 mounted in suitable bearings in uprights 42, 43. The shaft 41 is preferably driven from the shaft 20. This may be effected in any suitable manner, as by means of suitable sprocket gearing indicated generally at 44.

The lower finishing or pressure roll 27 may be driven in any suitable manner, as by a belt 45 passing about a pulley thereon and about a pulley 46 upon the shaft 29 of the former 28.

In Fig. 7, I have represented certain of the elements of a tire constructed in accordance with my invention. Therein the basal member of the tire is represented at 47, it being of rubber or other suitable material and having flanges 48, 49. It is herein represented as arched in form and as receiving thereon a pair of layers 50, 51 constructed as hereinbefore described and between which are positioned reinforcing members 52, 53.

It is evident that within the scope and purpose of my invention, I may provide only one series of strands to constitute a layer of the tire. Such a single series of strands, if provided, would be relatively revolved about the edge strands 13, 14 in any suitable manner. It is evident that the edge strands may be of any suitable material, and while it is not essential for all purposes that said edge strands be actually incorporated in the layer, and hence in the tire, preferably they are so incorporated therein.

While I have referred to a series of strands 10 or 11, it is evident that within the scope and range of my invention I may in certain cases substitute a single wide ribbon or tape for either or for each layer. If strands are employed, they may be of any suitable character and width, a series of narrow tapes being employed if desired.

It will be noted that my process, which may be carried out by the machine described, contemplates the use of two bead-forming strands of indefinite length which are fed forward from end to end and wrapped with body forming strands as they are fed. The layer formed by the wrapped strands may be of any desired length and may be coiled on the former or otherwise brought into tire form progressively as the strands are wrapped. The tire may thus be very expeditiously formed and it is easy to insert material between the various layers if desired, for example, strips of woven fabric to reinforce the tire at the zones of greatest wear.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Mechanism for forming tires comprising means to space a pair of strands in general parallel relation, a support for a series of unwoven parallel strands, said support being mounted in inclined relation to said pair of strands, and means to revolve said support about said pair of strands.

2. Mechanism for forming tires comprising means to space a pair of strands in general parallel relation, a plurality of spools supported in inclined relation with respect to said pair of strands, and means to revolve said spools about said strands, thereby to wrap material mounted upon said spools in zigzag relation about said strands.

3. Mechanism for forming tires comprising means to space a pair of strands in general parallel relation, means to support one or more series of parallel strands in unwoven condition, means to wrap said parallel strands in zigzag relation about said pair of strands, and means whereon the completed layer may be positioned.

4. Mechanism for forming tires comprising means to space a pair of strands in general parallel relation, means to wrap a series of parallel, non-woven strands in zigzag condition about said pair of strands, and a former whereon the completed layer may be wound.

5. Mechanism for forming tires comprising means to space a pair of strands in general parallel relation, a support having a member mounted for rotation thereon, a plurality of spools mounted in inclined relation upon said member, presser rolls in advance of the means to space said pair of strands, a former for the completed layer, and means to rotate said former.

6. Mechanism for forming tires comprising a member 15 to space a pair of strands in general parallel relation, a rotatable member 7, spools 8, 9 mounted thereon for revolution about said member 15, and a former 28 for receiving the completed layer.

7. Mechanism for forming tires comprising a member 15 to space a pair of strands in general parallel relation, a rotatable member 7, spools 8, 9 mounted thereon for revolution about said member 15, presser rolls 26, 27 for receiving the layer, and a former 28 to which the completed layer passes over the presser rolls 26, 27.

8. Mechanism for forming tires comprising a member 15 to space a pair of strands in general parallel relation, a tubular member 2 to receive said pair of strands, spools 8, 9 mounted for revolution upon said member 2, and presser rolls and a former operatively in advance of spools 8, 9.

9. Mechanism for forming tires comprising means to space a pair of bead-forming strands in general parallel relation, a spool adapted to sustain a plurality of body-forming strands, means to cause relative epicyclic motion between said spool and said bead-forming strands and means to cause relative feeding movement between the bead-forming strands and spool.

10. Mechanism for forming tires comprising means to space a pair of bead-forming strands in general parallel relation, a device adapted to hold a plurality of body strands in closely adjacent position for wrapping about said bead-forming strands and means to cause said device to revolve bodily in an orbit about said bead-forming strands whereby the body strands are drawn from said device.

11. Mechanism for constructing tires comprising supply means for a pair of strands, a rotatable member 28 arranged to draw from end to end said strands, in general parallel relation from said supply means and means between said supply means and member for wrapping body-forming strands in zigzag relation about said pair of strands.

12. Mechanism for constructing tires comprising supply means for a pair of strands, a rotatable tire-shaped former arranged to draw said strands from end to end in general parallel relation from said supply means, means between said supply means and member for wrapping body-forming strands in zigzag relation about said pair of strands, and mechanism for shaping the wrapped strands about said former.

13. A process of forming tires comprising the following steps:—feeding forward a pair of strands of indefinite length, wrapping body-forming strands in zigzag relation about said strands as they are fed and progressively and in synchrony with such movement coiling the wrapped strands into tire form.

In testimony whereof I have signed my name to this specification.

HENRY J. DOUGHTY.